United States Patent
Mai et al.

(10) Patent No.: US 11,645,328 B2
(45) Date of Patent: May 9, 2023

(54) 3D-AWARE IMAGE SEARCH

(71) Applicant: ADOBE INC., San Jose, CA (US)

(72) Inventors: Long Mai, San Jose, CA (US); Michael Alcorn, Auburn, AL (US); Baldo Faieta, San Francisco, CA (US); Vladimir Kim, Seattle, WA (US)

(73) Assignee: ADOBE INC., San Jose, CA (US)

( * ) Notice: Subject to any disclaimer, the term of this patent is extended or adjusted under 35 U.S.C. 154(b) by 560 days.

(21) Appl. No.: 16/821,301

(22) Filed: Mar. 17, 2020

(65) Prior Publication Data

US 2021/0294834 A1 Sep. 23, 2021

(51) Int. Cl.
| | |
|---|---|
| *G06F 16/00* | (2019.01) |
| *G06F 16/56* | (2019.01) |
| *G06F 16/53* | (2019.01) |
| *G06N 20/10* | (2019.01) |
| *G06N 3/084* | (2023.01) |
| *G06F 18/22* | (2023.01) |
| *G06F 18/2113* | (2023.01) |
| *G06V 10/25* | (2022.01) |
| *G06V 10/764* | (2022.01) |
| *G06V 10/82* | (2022.01) |
| *G06V 20/30* | (2022.01) |

(52) U.S. Cl.
CPC ............. *G06F 16/56* (2019.01); *G06F 16/53* (2019.01); *G06F 18/2113* (2023.01); *G06F 18/22* (2023.01); *G06N 3/084* (2013.01); *G06N 20/10* (2019.01); *G06V 10/25* (2022.01); *G06V 10/764* (2022.01); *G06V 10/82* (2022.01); *G06V 20/30* (2022.01)

(58) Field of Classification Search
None
See application file for complete search history.

(56) References Cited

U.S. PATENT DOCUMENTS 7,626,569 B2 * 12/2009 Lanier .................... G06F 3/012
348/42

FOREIGN PATENT DOCUMENTS

CN 101866366 A * 10/2010

OTHER PUBLICATIONS

Yixuan Su. Aug. 2018. Relation Clasification based on Deep Learning Approach.*

* cited by examiner

*Primary Examiner* — Tuankhanh D Phan
(74) *Attorney, Agent, or Firm* — F. Chau & Associates, LLC (57) ABSTRACT

Systems and methods for performing image search are described. An image search method may include generating a feature vector for each of a plurality of stored images using a machine learning model trained using a rotation loss term, receiving a search query comprising a search image with object having an orientation, generating a query feature vector for the search image using the machine learning model, wherein the query feature vector is based at least in part on the orientation, comparing the query feature vector to the feature vector for each of the plurality of stored images, and selecting at least one stored image of the plurality of stored images based on the comparison, wherein the at least one stored image comprises a similar orientation to the orientation of the object in the search image.

20 Claims, 11 Drawing Sheets

● Match Object Pose —— 405

3D-AWARE IMAGE SEARCH

BACKGROUND

The following relates generally to image processing, and more specifically to performing image search based on three dimensional (3D) image properties.

Machine learning systems may be used for a variety of image recognition tasks. For example, image search products may utilize machine learning to provide a set of similar images given a user-provided query image. Casual users may use an image search tool to recall photos of moments in time from a personal photo collection, while professional graphic designers may look for stock images to assist in their projects.

However, image search tools are often trained on two dimensional (2D) image datasets. Therefore, the search models may not encode 3D information such as object orientation. As a result, the search results may not be filtered based on 3D information. This may cause users to manually filter search results, which can cause a significant loss of both time and money.

SUMMARY

A method for performing image search is described. Embodiments of the method may include generating a feature vector for each of a plurality of stored images using a machine learning model trained using a rotation loss term, receiving a search query comprising a search image with object having an orientation, generating a query feature vector for the search image using the machine learning model, wherein the query feature vector is based at least in part on the orientation, comparing the query feature vector to the feature vector for each of the plurality of stored images, and selecting at least one stored image of the plurality of stored images based on the comparison, wherein the at least one stored image comprises a similar orientation to the orientation of the object in the search image.

A system for performing image is described. Embodiments of the system may an encoder configured to generate a feature vector based on an image of an object, wherein the feature vector represents object synthesis information and rotation information, and wherein the encoder is trained using a multi-task loss function comprising an object synthesis loss term and a rotation loss term and a comparison component configured to determine the similarity between two feature vectors.

A method for training an artificial neural network (ANN) for performing image search based on 3D properties is described. Embodiments of the method may identify a training set, wherein each element in the training set includes an image of an object, and 3D orientation information, generate a feature vector for each element in the training set, calculate a loss value using a multi-task loss function comprising an object synthesis loss term and a rotation loss term, and update the ANN based at least in part on the loss value.

DETAILED DESCRIPTION

The present disclosure relates to image searching based on three dimensional (3D) image properties such as object orientation. Image search applications are widely used to help users find relevant images. In some examples, image search is based on a text query. In other examples, image search may be based on an image query.

That is, image search applications may provide a set of similar images given a user-provided query image. For example, a user may provide an image of a car, and a search tool may identify similar car images from a database and provide them to the user. Conventional image search models use a two-dimensional (2D) image model. That is, the query image is treated as a flat, 2D input. Thus, the image features extracted by these models can be effective in retrieving semantically relevant images, but do not capture three dimensional (3D) information such as object perspective and orientation information.

Figure 3:
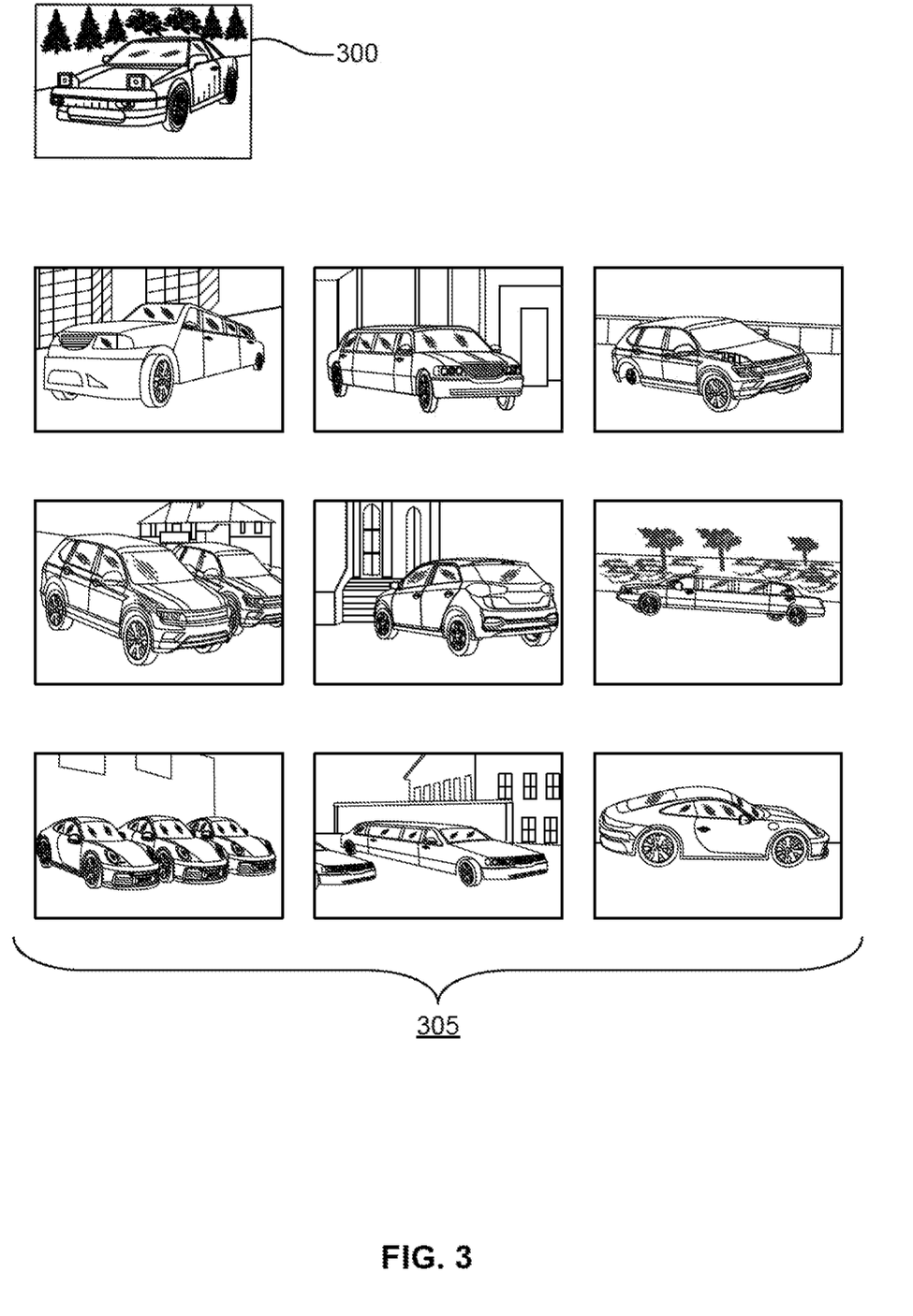
FIG. 3 shows an example of search results that are not filtered based on object pose according to aspects of the present disclosure.

As a result, conventional image search results cannot capture or match the object perspective or orientation depicted in the query. In the car example, the images returned by a conventional search tool may include cars facing every direction. FIG. 3 of the present disclosure depicts an example in which search results include cars oriented in a variety of poses. In order to filter the results to include only cars with an orientation similar to the query image, a user would have to review the search results and select matching images manually.

Figure 4:
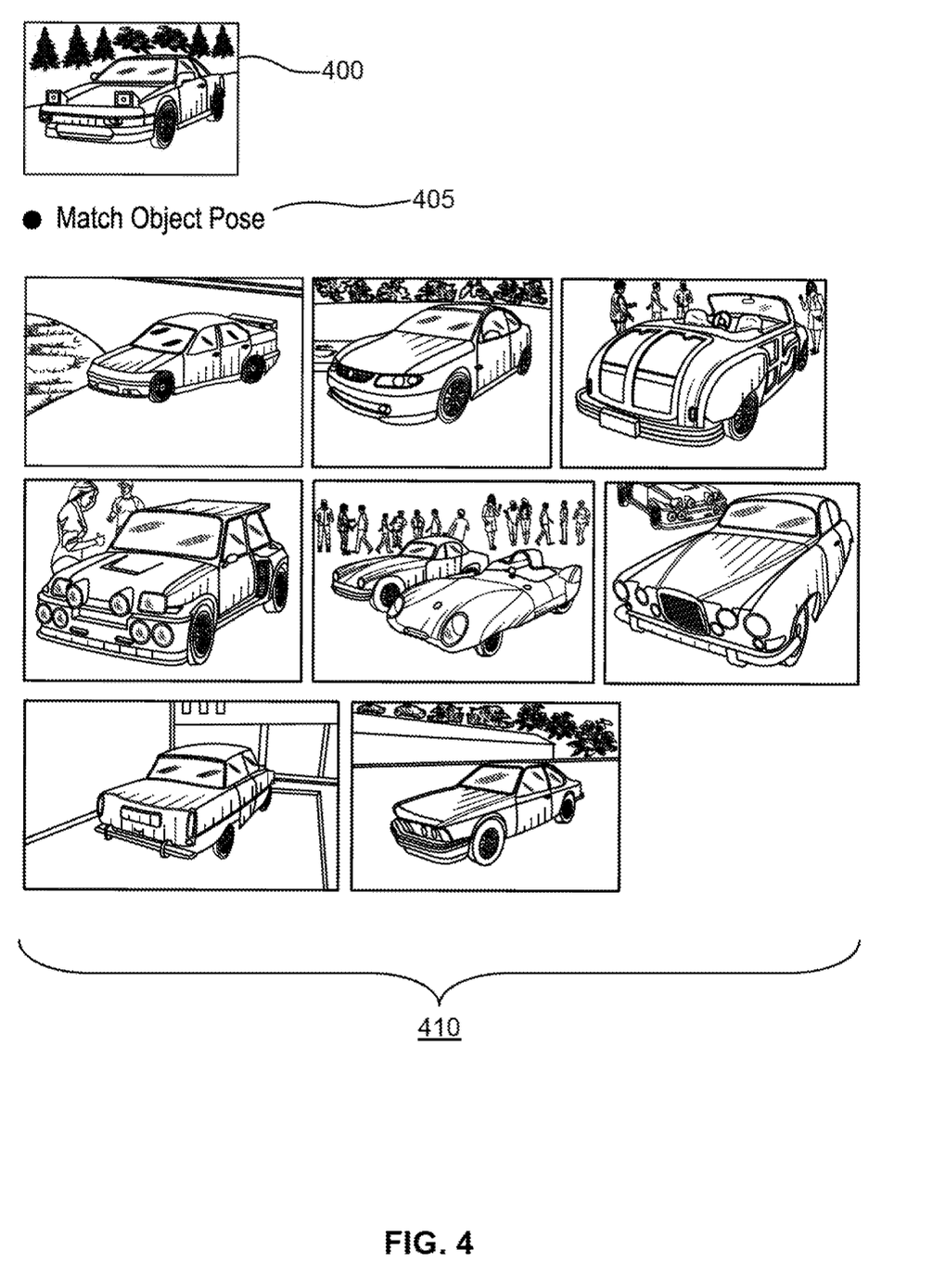
FIG. 4 shows an example of search results filtered based on object pose according to aspects of the present disclosure.

Therefore, the present disclosure describes systems and methods for 3D-aware feature learning and image search. Learned embedding of 3D-aware features (e.g., object pose or orientation) enables the retrieval image search results that are both semantically relevant and that take into account the 3D perspective of the query object. So, for example, a user may provide an image query that includes a car with a particular orientation, and indicate that only images having a car with the same orientation are desired. FIG. 4 of the present disclosure illustrates an example in which a user selects an option to "match object pose" and receives search results that include objects having a similar pose as the query image.

Thus, according to embodiment of the present disclosure, a search tool may then return only images of cars that have a similar orientation (instead of just a set of randomly oriented cars). This can enable the user to find relevant images without filtering through the search results manually.

In an object-centric image search, the query image contains an object of interest on an arbitrary background. Information about the image, including information about the object of interest, may be captured in a representation space known as a descriptor. In some cases, both the user provided query image and a set of database images may be represented using the same descriptor. For example, both the query image and the images in the database may be transformed into vectors within the same vector space. A nearest neighbor search based on the descriptor representations may be used to select images for retrieval.

Thus, according to the present disclosure, the descriptor captures 3D information such as object perspective or orientation. Specifically, an artificial neural network (ANN) that generates the feature vector is trained using a loss function that one or more tasks based on 3D information. The learned embedding enables the retrieval of image search results that are both semantically relevant and that respect the 3D perspective of a query object. Embodiments of the present disclosure, by automatically filtering images based on 3D information, may improve the search experience for a user, provide more relevant results, and save significant time that would otherwise be spent manually filtering the results.

The following terms are used throughout the present disclosure:

The term "feature vector" refers to the representation of an image (i.e., a search query or an image in a search database) within a vector space known as the descriptor space. According to at least one embodiment of the present disclosure, a neural network is trained to produce feature vectors that include 3D information such as object orientation using a multi-task loss function.

The term "loss function" refers to a function used during the training of a neural network to determine the quality of the output. That is, after the neural network parameters are initialized, one or more feature vectors are output, and the loss function provides a value representing how well suited the feature vectors are for performing one or more tasks. Each task may be represented in a separate loss value, such as a rotation loss, a synthesis loss, a ranking loss, or a classification loss.

The term "rotation loss" refers to a part of the loss function that measures how well a feature vector captures rotation information. For example, the feature vector may be used to predict the difference in rotation between the objects in two different training images. The predicted difference may then be compared to the actual difference in rotation.

The term "synthesis loss" or "object synthesis loss" refers to a part of the loss function that measures how well the neural network can be used to recreate the object of interest. For example, the object may be reconstructed from the feature vector and the synthesis loss may quantify a difference between the reconstructed object and an original version of the same object.

The term "ranking loss" or "image ranking loss" may be performed by a part of the loss function that measures how well the neural network may be used to select relevant images. For example, three images may be provided, and the two most relevant images may be selected. The selection may then be compared to a known relevance ranking, and the ranking loss may capture whether the two most relevant images are correctly identified.

The term "classification loss" refers to a part of the loss function that measures how well the neural network captures semantic classification information. For example, the classification loss may measure whether a car is correctly identified as a car, and whether a guitar is correctly identified as a guitar.

System Overview

Figure 1:
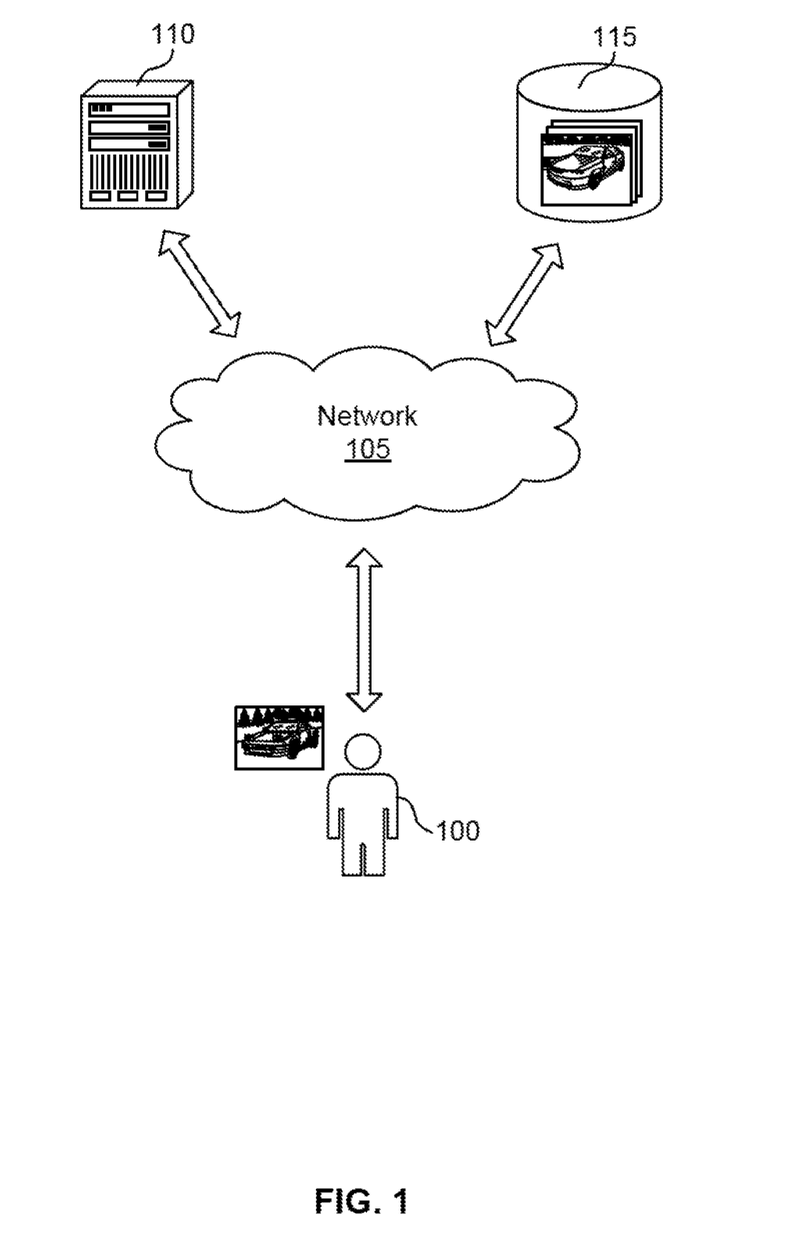
FIG. 1 shows an example of a system for image search according to aspects of the present disclosure.

FIG. 1 shows an example of a system for image search according to aspects of the present disclosure. The example shown includes user 100, network 105, server 110, and database 115. Server 110 may be an example of, or include aspects of, the corresponding element described with reference to FIG. 5.

A user 100 may submit an image query to the server 110 via network 105. The user may indicate that the results should be selected or filtered based on a 3D characteristic such as the orientation of an object. The server may generate a feature vector representing the query image and compare the feature vector (i.e., the descriptor) to images stored in the database 115. Relevant images may then be selected and returned to the user 100.

In some examples, the pose of the object in the query image can be transposed to various different orientations. For example, if an image with a car is input to the system with the front facing left, and no vertical bias, the server may provide a method to adjust the requested output image (or image results) given a set of orientation parameters. Orientation parameters may include rotation about the x-axis, y-axis, or z-axis, but they are not limited thereto.

Figure 2:
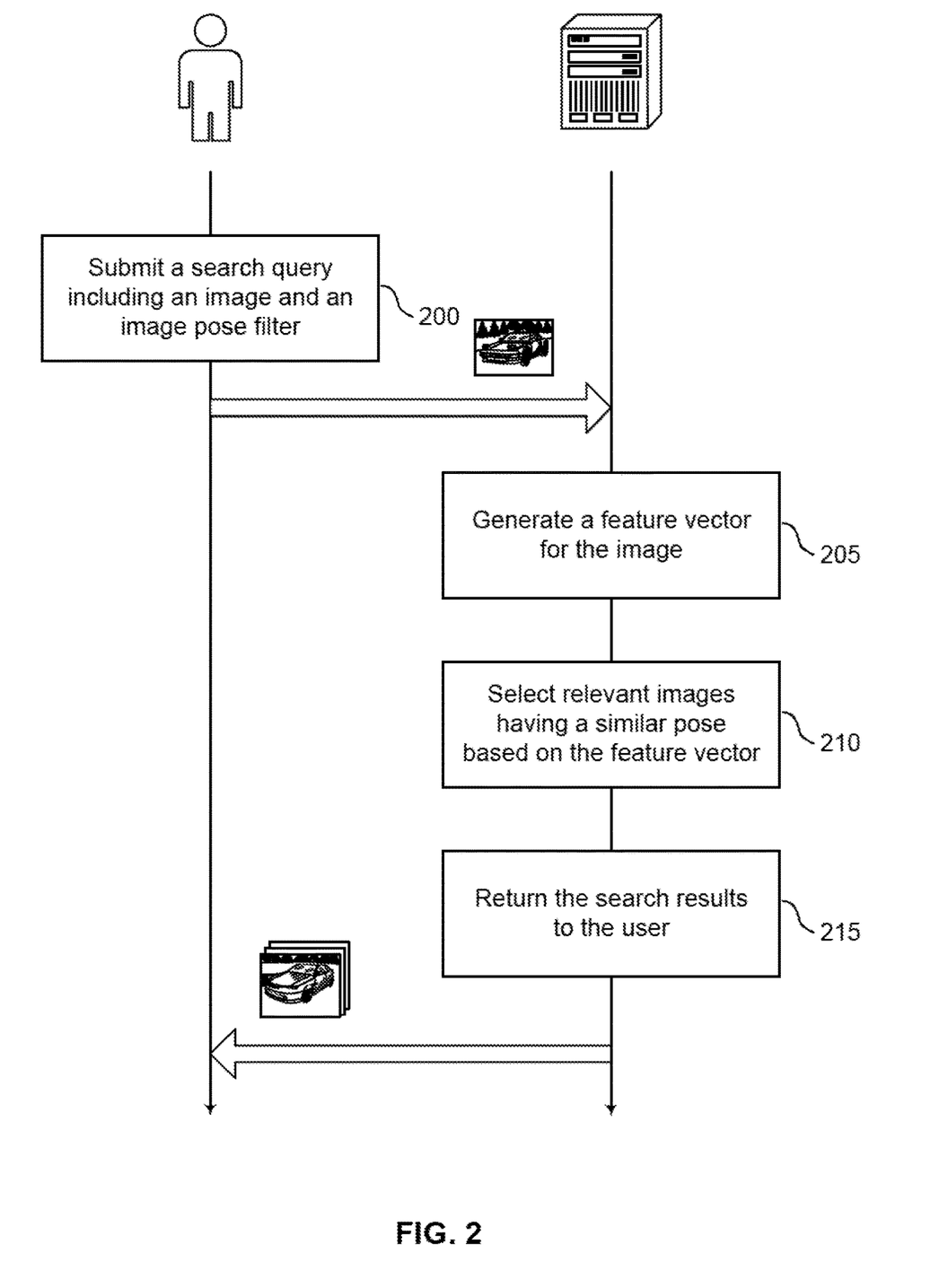
FIG. 2 shows an example of a process for image search according to aspects of the present disclosure.

FIG. 2 shows an example of a process for image search according to aspects of the present disclosure. In some examples, these operations may be performed by a system including a processor executing a set of codes to control functional elements of an apparatus (e.g., the server 100 described with reference to FIG. 1). Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 200, the user submits a search query including an image and an image pose filter. For example, the user may submit an image of a car with a particular orientation as described with reference to FIG. 3. In some cases, the operations of this step may be performed by a user as described with reference to FIG. 1.

At operation 205, the system generates a feature vector for the image. The feature vector (i.e., the descriptor) may incorporate the orientation information of the object in the image. In some cases, the operations of this step may be performed by a server as described with reference to FIGS. 1 and 5.

At operation 210, the system selects relevant images having a similar pose based on the feature vector. For example, the feature vector generated for the query image may be compared against other vectors representing images stored in a database. Images that are sufficiently close to the query image may be selected. Because the feature vectors incorporate orientation image, the resulting images may share a common orientation with the query image. In some cases, the operations of this step may be performed by a server as described with reference to FIGS. 1 and 5.

At operation 215, the system returns the search results to the user. For example, a server may return images of cars having a similar orientation to the car in the query image as illustrated in FIG. 3. In some cases, the operations of this step may be performed by a server as described with reference to FIGS. 1 and 5.

FIG. 3 shows an example of search results 305 that are not filtered based on object pose according to aspects of the present disclosure. The example shown includes a query image 300 and search results 305.

The query image 300 includes a car having a particular orientation. Once the user submits the query, a server may select images having similar objects. These images may be returned to the user as the search results 305. If the user wishes to select objects having a similar 3D orientation, the user may filter the objects manually.

FIG. 4 shows an example of search results 410 filtered based on object pose according to aspects of the present disclosure. The example shown includes query image 400, object pose indication 405, and search results 410.

The query image 400 includes a car having a particular orientation. A user may set a parameter including the object pose indication 405, which indicates that the user prefers search results that include an object having a similar pose as the object in the query image 400 (i.e., the car in this case). Although FIG. 4 illustrates an example in which the user selects an object pose filter, other 3D aware search parameters are also possible (i.e., shape, volume, depth, etc.).

Once the user submits the query, a server may select images having similar objects, and in which the objects have a similar orientation. These images may be returned to the user as the search results 410. Thus, the user may save time and effort spent filtering the search results 410 manually.

System Architecture

Figure 5:
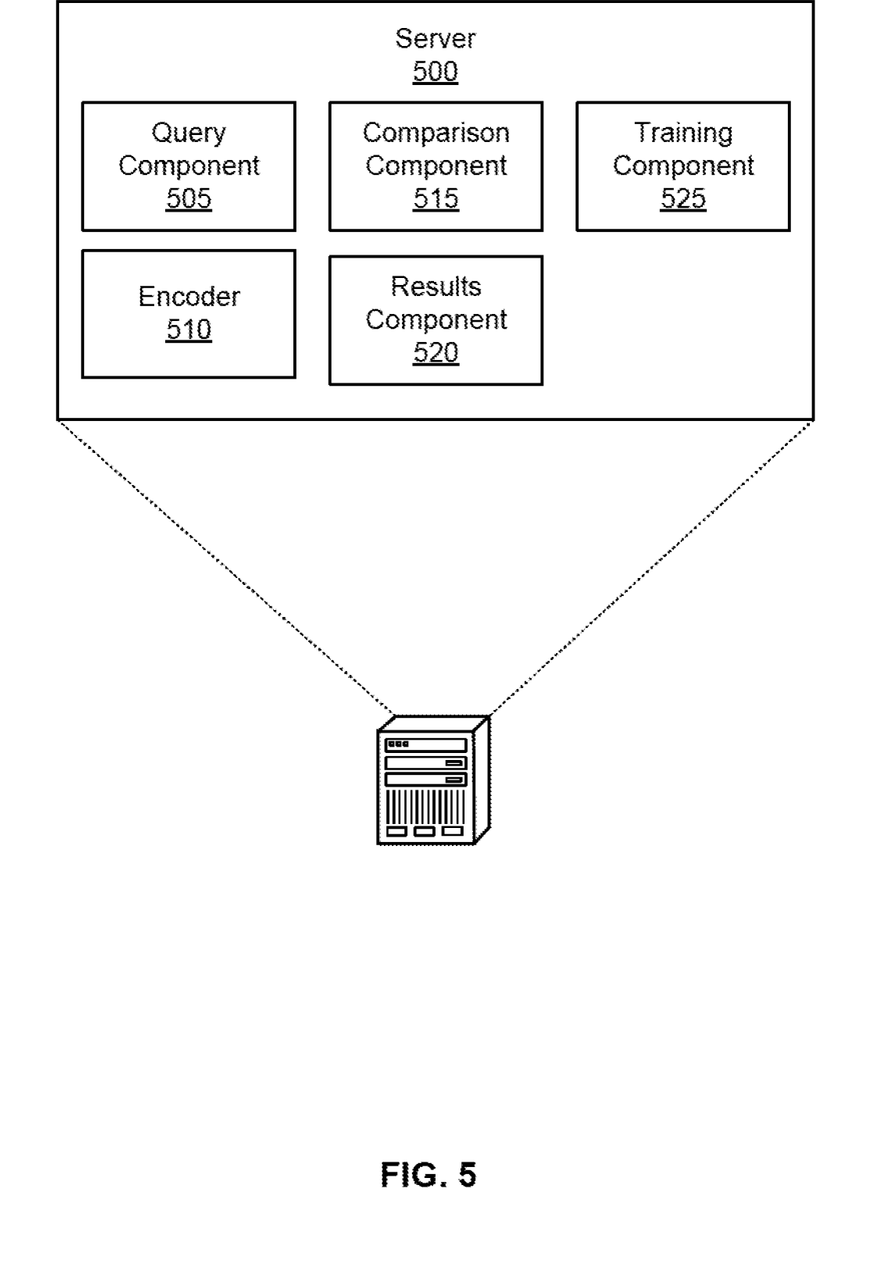
FIG. 5 shows an example of a server for image search according to aspects of the present disclosure.

FIG. 5 shows an example of a server 500 for image search according to aspects of the present disclosure. Server 500 may be an example of, or include aspects of, the corresponding element described with reference to FIG. 1. Server 500 may include query component 505, encoder 510, comparison component 515, results component 520, and training component 525.

Query component 505 receives a search query including an image of an object. Query component 505 may also determine that a search parameter of the search query indicates a search for objects having a similar pose to the object in the image.

Encoder 510 generates a feature vector based on the image, where the feature vector represents object synthesis information and rotation information. In some examples, the feature vector further represents semantic information. For example, semantic information may include information for classifying an object into one or more object categories (i.e., classifying an object as a car or a guitar.) In some examples, the feature vector further represents appearance information (e.g., information related to the use of color, edges, or other image elements).

The encoder 510 may be trained using a multi-task loss function including, for example, an object synthesis loss term and a rotation loss term. During training, encoder 510 may generate a feature vector for each element in the training set. Encoder 510 may be an example of, or include aspects of, the corresponding element described with reference to FIG. 6.

In some examples, the synthesis loss term is based on whether the object can be synthesized based on the feature vector (i.e., using a pixel-wise comparison of the original object and the synthesized object). In some examples, the rotation loss term is based on a measure of a difference in a pose of the object compared to a pose of at least one additional object (i.e., finding the difference between a predicted orientation and ground-truth orientation information).

In some examples, the multi-task loss function further includes a ranking loss term or a classification loss term. The ranking loss may be based on selecting the most relevant two images from a set of three images based on relevance. In some cases, the classification loss may be based on object classification accuracy.

In some examples, the encoder 510 may include an artificial neural network (ANN) including a convolutional neural network (CNN) layer and a multilayer perceptron (MLP) layer. An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A CNN is a neural network characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. CNN layers are commonly used for image processing because they can process large amounts of data (e.g., images that include a large number of pixels).

An MLP is a feed forward neural network that typically consists of multiple layers of "perceptrons." Each component perceptron layer may include an input layer, one or more hidden layers, and an output layer. Each node may include a nonlinear activation function. An MLP may be trained using backpropagation (i.e., computing the gradient of the loss function with respect to the parameters).

Comparison component 515 compares the feature vector to a set of additional feature vectors corresponding to additional images (e.g., other images stored in a database). In some examples, comparing the feature vector to the set of additional feature vectors includes calculating a Euclidean distance or a cosine distance between the feature vector and each of the set of additional feature vectors. Thus, comparison component 515 may be configured to determine the similarity or relevance between two feature vectors.

Results component 520 selects one or more of the additional images having a similar rotational pose (or other 3D characteristics) as the object in the query image. For example, the one or more additional images may be selected based on a similarity between the feature vector and a subset of the additional feature vectors corresponding to the one or more additional images (i.e., additional images that are relevant to the search query). Results component 520 may also provide the one or more additional images to a user in response to the search query.

Training component 525 trains an ANN (i.e., the encoder 410) to generate feature vectors that incorporate 3D information. Training component 525 may also identify a training set, where each element in the training set includes an image of an object and 3D information, such as rotation information. Training component 525 calculates a loss value using the multi-task loss function including an object synthesis loss term and a rotation loss term, and updates the ANN based on the loss value. The loss value is calculated, and the ANN is updated, during each of a set of training iterations.

Training component 525 may generate a synthesized version of the object based on the feature vector, where the object synthesis loss term is calculated based on a comparison between the object and the synthesized version of the object.

In some examples, the multi-task loss function further includes a ranking loss term or a classification loss term. Training component 525 may identify two additional images (for a total of three images), and select a most relevant image from the two additional images (that is, a single pair or relevant images is selected from of the three images). The ranking loss term is based on the selection. In some examples, the ranking loss is based on one or more parameters from a set consisting of comparing pose similarity, object similarity, and category similarity.

Figure 6:
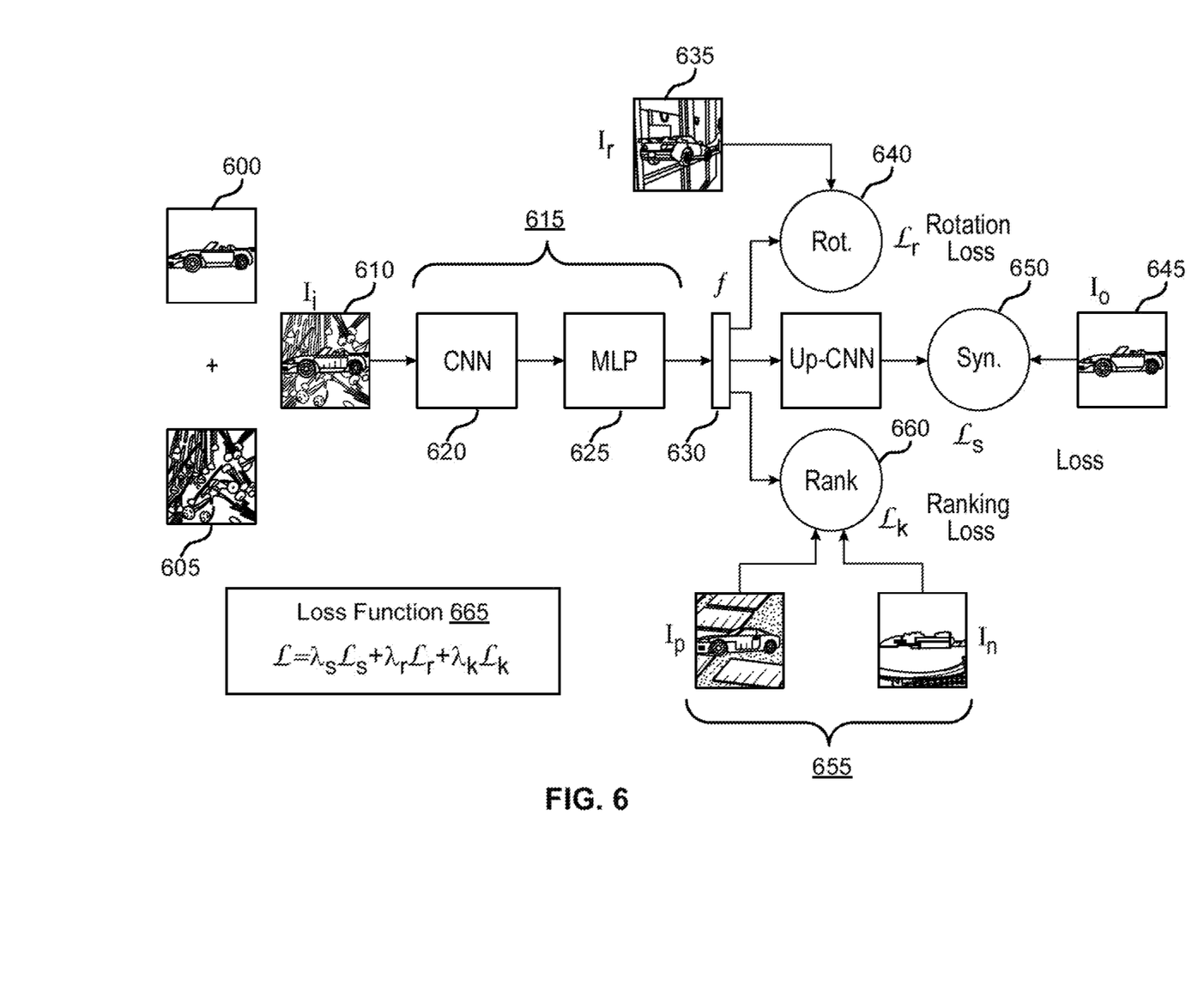
FIG. 6 shows an example of an artificial neural network (ANN) for image search according to aspects of the present disclosure.

FIG. 6 shows an example of an ANN for image search according to aspects of the present disclosure. The example shown includes 3D object 600, background image 605, generated image 610, encoder 615, feature vector 630, rotated image 635, rotation loss 640, comparison object 645, synthesis loss 650, ranking images 655, ranking loss 660, and loss function 665.

To form a training set that includes known rotation information, a number of 3D objects 600 may be combined with the background images 605 to form generated images 610. These generated images 610 may be passed to the encoder 615 to produce feature vector 630. Encoder 615 may include CNN 620 and MLP 625, and may be an example of, or include aspects of, the corresponding element described with reference to FIG. 5.

A loss function may then use the feature vector 630 to compute a loss value, which may be used to update parameters of the encoder 615. According to the embodiment illustrated in FIG. 6, the loss function includes three tasks: a rotation loss, a synthesis loss, and a ranking loss. However, the disclosure is not limited to these three loss terms. Other suitable loss functions include at least one loss term corresponding to semantic information or object information and at least one loss term measuring how well the feature vector captures 3D information such as orientation, rotation, shape, volume, depth, etc.).

In the example illustrated in FIG. 6, the loss function is represented by the equation $L=\lambda_s L_s + \lambda_r L_r + \lambda_k L_k$ where $L_s$ represents a synthesis loss 650, $L_r$ represents a rotation loss 640, and $L_k$ represents a ranking loss 660. The weighting factors, $\lambda$, may determine the relative importance of each part of the loss function.

The rotation loss 640 may be computed by calculating a rotation difference between the feature vector 630 and another rotated image 535. Another feature vector may be computed for the other rotated image 635 using 635, and a rotational delta may be computed based on a comparison of the feature vectors. For example, in some embodiments a multi-level perceptron (MLP) network may be used that takes the feature vectors for two images as input and outputs the rotation difference.

The synthesis loss may be computed by reconstructing an object from the feature vector 630 (e.g., using a reverse CNN or Up-CNN), and comparing it to comparison object 645. In some embodiments, the Up-CNN generates an image from the feature vector f. The synthesis loss may be defined as a pixel-wise difference between the generated image and the original image.

The ranking loss may be computed based on selecting the most relevant image between the ranking images 655. For example, two additional feature vectors (one for each of the additional comparison images 655) may be generated using the encoder 615, and then the image that is most relevant to the feature vector 630 may be selected (e.g., using a triplet loss, which determines whether the most relevant pair from a set of three images has been selected).

In one embodiment, for purposes of the ranking loss, identifying the same object (SO) may be set to a higher priority than selecting an object from the same category (SC) rather than a different category (DC). The categories may include classification categories such as car, person, guitar, etc. Identifying an object in the same category may be a higher priority than identifying the right pose (RP) as opposed to the wrong pose (WP).

Rotation Loss

Figure 7:
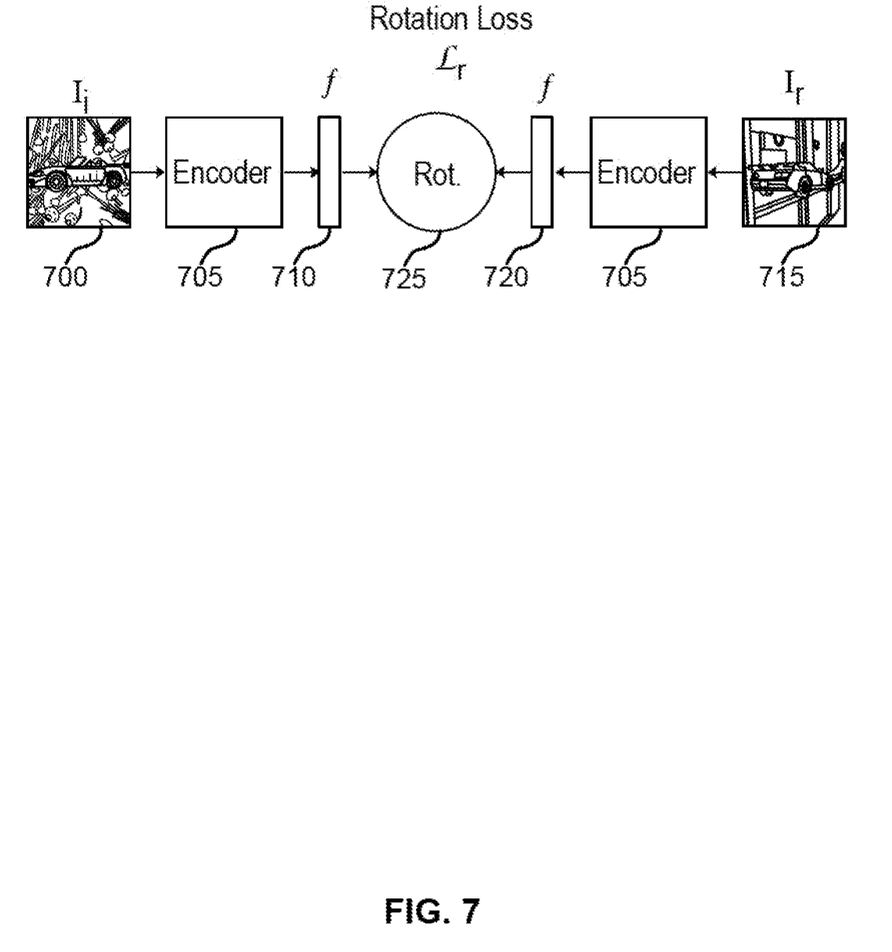
FIG. 7 shows an example of a process for determining a rotation loss according to aspects of the present disclosure.

FIG. 7 shows an example of a process for determining a rotation loss according to aspects of the present disclosure. The rotation loss 725 may be computed by calculating a rotation difference between the feature vector 710 of the input image 700 (i.e., based on the encoder 705) and additional feature vector 720 of another rotated image 715 (e.g., created using the same encoder 705, which is shown twice here to illustrate that it is used on two different images).

That is, another feature vector may be computed for the other rotated image 71, and a rotational delta may be computed based on a comparison of the feature vectors. For example, in some embodiments a multi-level perceptron (MLP) network may be used that takes the feature vectors for two images as input and outputs the rotation difference. The actual rotation difference is already known before training, so the rotation loss 725 may be computed by comparing the rotation loss predicted based on the feature vectors generated by the encoder 705 and the actual rotation difference. The rotation loss 725 may then be used to update the parameters of the encoder 705.

For example, during the training process, the weights of the encoder 705 may be adjusted to improve the accuracy of the result by minimizing the rotation loss 725 (or a multi-task loss function including the rotation loss 725). The weight of an edge may increase or decrease the strength of the signal transmitted between nodes. In some cases, nodes may have a threshold below which a signal is not transmitted at all.

Ranking Loss

Figure 8:
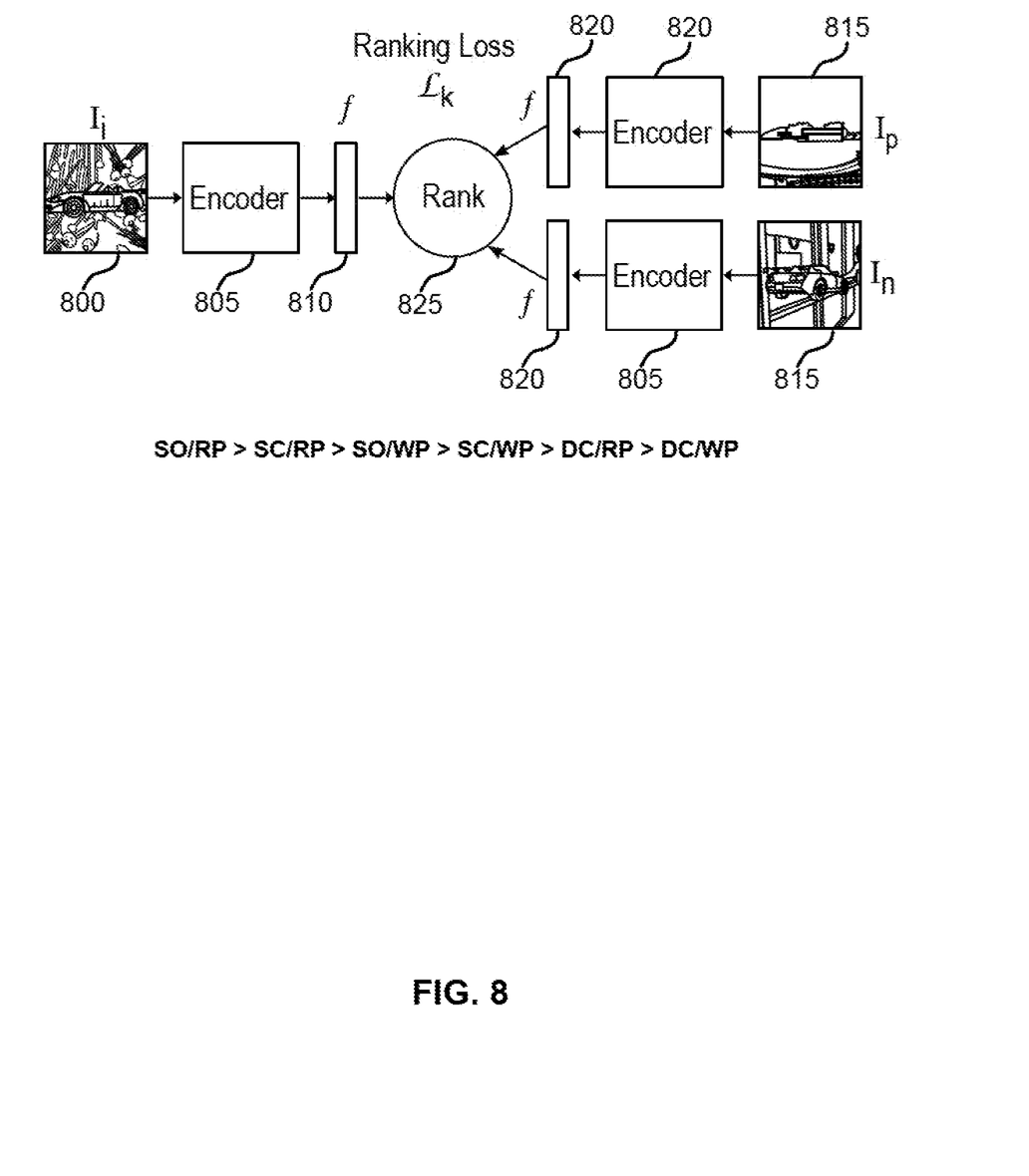
FIG. 8 shows an example of a process for determining a ranking loss according to aspects of the present disclosure.

FIG. 8 shows an example of a process for determining a ranking loss 825 according to aspects of the present disclosure. The ranking loss 825 may be computed based on selecting the most relevant image among an input image 800 and comparison images 815. For example, two additional feature vectors 820 (one for each of the additional comparison images 815) may be generated using the encoder 805, and the image that is most relevant to the feature vector 810 corresponding to the input image 800 may be selected. In one embodiment, the ranking loss 825 may comprise a triplet loss that determine whether the most relevant pair from the set of three images has been selected).

In some cases, for purposes of the ranking loss 825, identifying the same object (SO) may be set to a higher priority than selecting an object from the same category (SC) rather than a different category (DC). The categories may include semantic classification categories such as car, person, guitar, etc. Identifying an object in the same category may be a higher priority than identifying the right pose (RP) as opposed to the wrong pose (WP). Thus, the prioritization may be represented by the prioritization SO/RP>SC/RP>SO/WP>SC/WP>DC/RP>DC/WP.

The ranking loss 825 may then be used to determine how to update the encoder 805 during training. For example, during the training process, the weights of the encoder 805 may be adjusted to improve the accuracy of the result by minimizing the ranking loss 825 (or a multi-task loss function including the ranking loss 825).

Synthesis Loss

Figure 9:
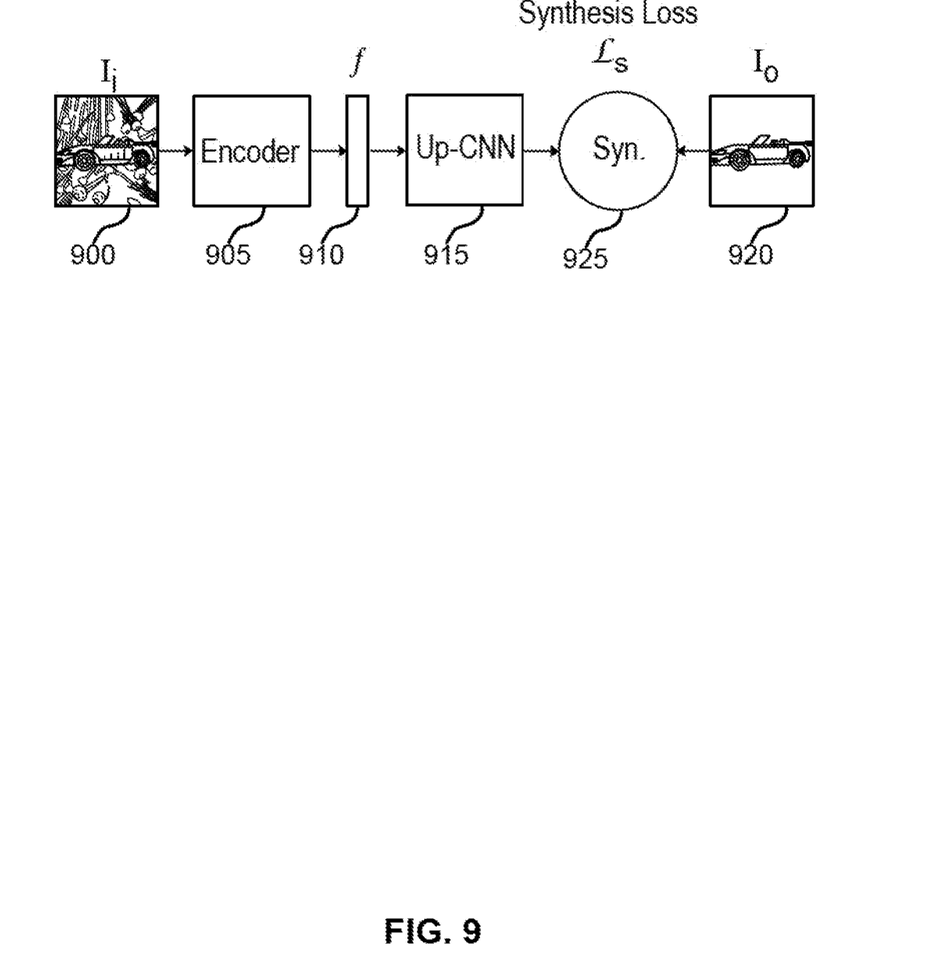
FIG. 9 shows an example of a process for determining a synthesis loss according to aspects of the present disclosure.

FIG. 9 shows an example of a process for determining a synthesis loss 925 according to aspects of the present disclosure.

The synthesis loss 925 may be computed by reconstructing an object from the feature vector 910 representing an input image 900 (e.g., using a reverse CNN or Up-CNN 915), and comparing it to comparison object 920. In some embodiments, the Up-CNN 915 generates an image from the feature vector f, and the generated image is used for the comparison. The synthesis loss 925 may be defined as the L2 pixel-wise difference $Loss(f)=\|I_f-I_0\|^2$, where $I_f$ represents the image generated from the feature vector 910 and $I_0$ represents the original object.

The synthesis loss 925 may then be used to determine how to update the encoder 905 during training. For example, during the training process, the weights of the encoder 905 may be adjusted to improve the accuracy of the result by minimizing the synthesis loss 925 (or a multi-task loss function including the synthesis loss 925).

3D Aware Search

Figure 10:
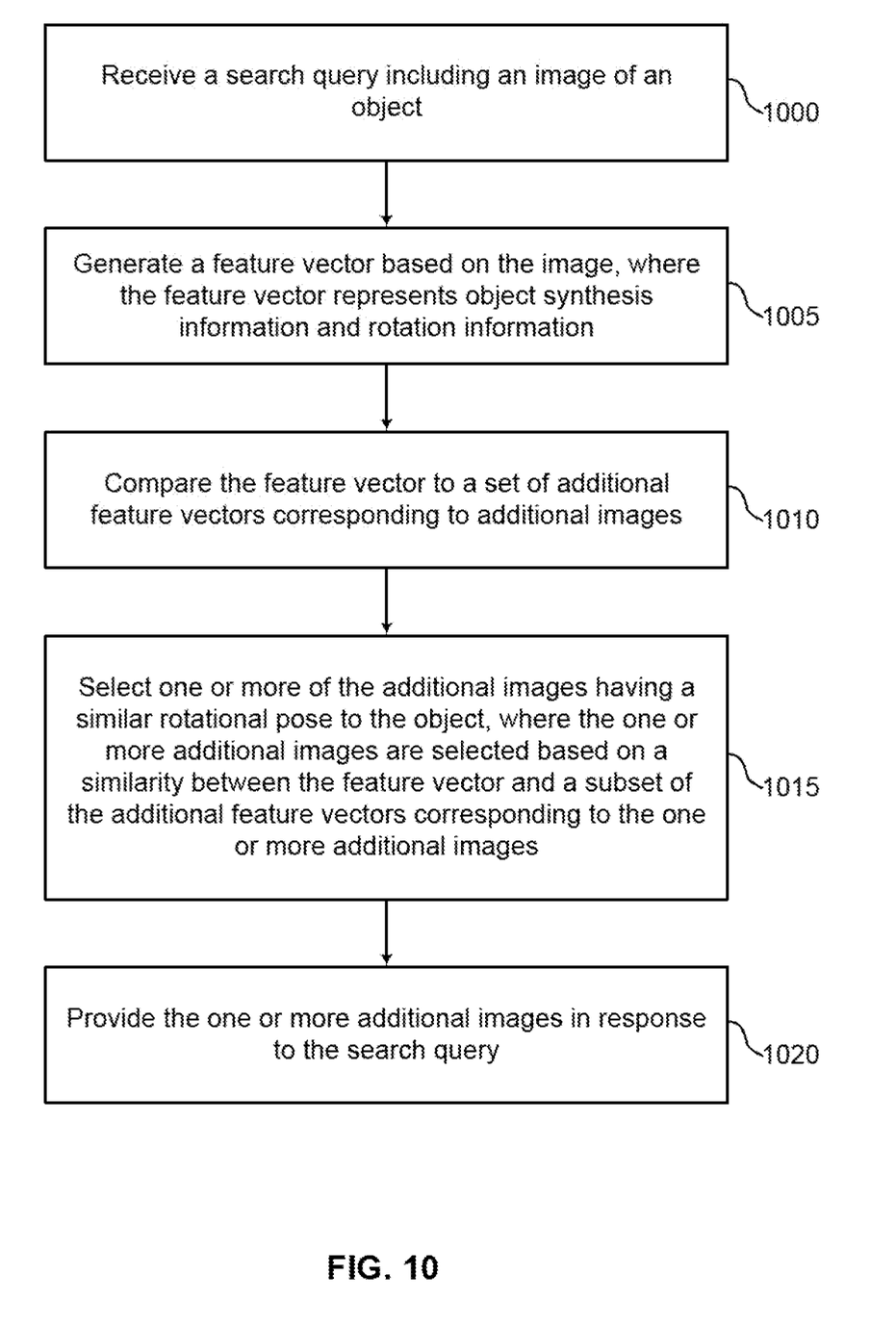
FIG. 10 shows an example of a process for performing image search based on 3D properties according to aspects of the present disclosure.

FIG. 10 shows an example of a process for performing image search based on 3D properties according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 1000, the system receives a search query including an image of an object. For example, the search query may include an image of a car that has a particular orientation as shown in FIG. 3. In some cases, the operations of this step may be performed by a query component as described with reference to FIG. 5.

At operation 1005, the system generates a feature vector (i.e., the descriptor) based on the image, where the feature vector represents object synthesis information and rotation information. For example, the search query may be input to an encoder including a neural network that has been trained using a loss function including a synthesis loss and a rotation loss. The encoder may include at least one CNN layer and at least one MLP layer. In some cases, the operations of this step may be performed by an encoder as described with reference to FIGS. 5 and 6.

At operation 1010, the system compares the feature vector to a set of additional feature vectors corresponding to additional images. For example, the feature vector may be compared to those of other images stored in a database. The comparison may include determining a Euclidean distance or a cosine distance between vectors, or otherwise identifying similar vectors. In some cases, the operations of this step may be performed by a comparison component as described with reference to FIG. 5.

At operation 1015, the system selects one or more of the additional images having a similar rotational pose to the object, where the one or more additional images are selected based on a similarity between the feature vector and a subset of the additional feature vectors corresponding to the one or more additional images. In some cases, the operations of this step may be performed by a results component as described with reference to FIG. 5. At operation 1020, the system provides the one or more additional images in response to the search query. In some cases, the operations of this step may be performed by a results component as described with reference to FIG. 5.

Training the Model

Figure 11:
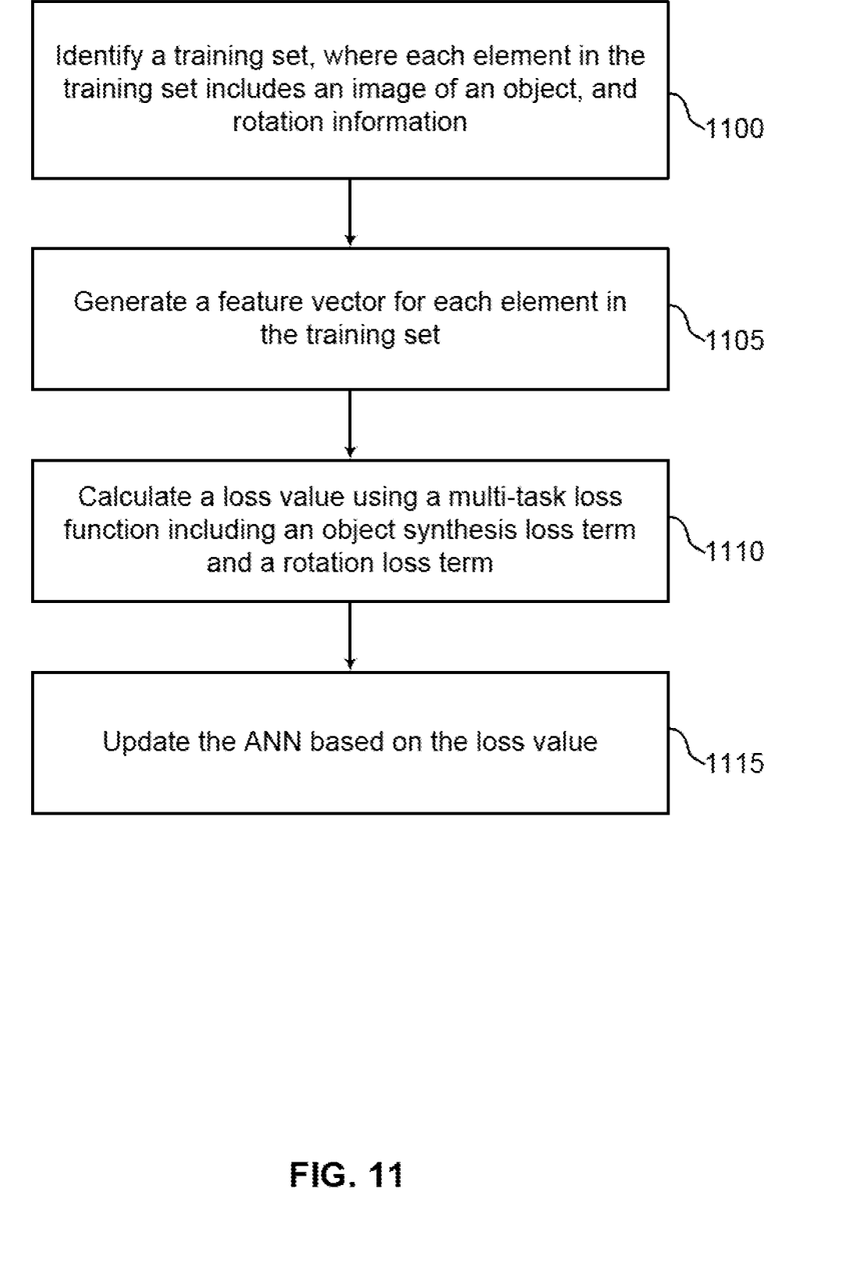
FIG. 11 shows an example of a process for training an ANN for image search based on 3D properties according to aspects of the present disclosure.

FIG. 11 shows an example of a process for training an ANN for image search based on 3D properties according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 1100, the system identifies a training set, where each element in the training set includes an image of an object, and rotation information. In some cases, the operations of this step may be performed by a training component as described with reference to FIG. 5.

In some cases, training data may be generated using a collection of 3D models. The orientation of the 3D models may be manipulated prior to rendering 2D training images. That is, to learn the 3D-aware features, training data is generated by rendering synthetic 3D objects onto a real image background. By using synthetic objects, the object perspective can be controlled during rendering. The 3D-Aware feature then uses the object perspective information during training.

During data generation, 3D object models may be obtained from an open dataset. For example, ShapeNet may be used as the 3D object model dataset. The objects are rendered onto a random real background obtained from a different dataset than the dataset used to obtain the 3D object models. For example, OpenImages V5 may be used to obtain random real images.

At operation 1105, the system generates a feature vector for elements in the training set. For example, the feature vectors may be generated using an encoder as described above. Initially, the encoder may include parameters that are initialized with random values. In some cases, the core model uses a convolutional neural network, taking an image as input. The core model then outputs a feature vector representing the descriptor to be used for an image search. During training, the input images are sampled from rendered image data. In some cases, the operations of this step may be performed by an encoder as described with reference to FIGS. 5 and 6.

At operation 1110, the system calculates a loss value using a multi-task loss function including an object synthesis loss term and a rotation loss term. For example, the loss function may correspond to the equation $L=\lambda_s L_s + \lambda_r L_r + \lambda_k L_k$. In some cases, additional loss terms may include a ranking loss term, a classification loss term, or any combination of these terms and the synthesis loss term and the rotation loss term. In some cases, the operations of this step may be performed by a training component as described with reference to FIG. 5.

At operation 1115, the system updates the ANN based on the loss value. In some cases, the operations of this step may be performed by a training component as described with reference to FIG. 5. According to at least one embodiment, an extension to the stochastic gradient descent, such as Adam Optimization Algorithm, is used to train the convolutional neural network with a loss function designed to encourage the features to capture both semantics and perspective information of an object.

After training, the network can be used to extract feature vector from any input image. The extracted feature vectors can be used as standard image descriptor in a similarity image search system.

Description of Various Embodiments

The present disclosure includes the following embodiments.

A method for performing image search based on 3D properties is described. Embodiments of the method may include receiving a search query comprising an image of an object, generating a feature vector based on the image, wherein the feature vector represents object synthesis information and rotation information, comparing the feature vector to a plurality of additional feature vectors corresponding to additional images, selecting one or more of the additional images having a similar rotational pose to the object, wherein the one or more additional images are selected based on a similarity between the feature vector and a subset of the additional feature vectors corresponding to the one or more additional images, and providing the one or more additional images in response to the search query.

Some examples of the method described above may further include determining that a search parameter of the search query indicates a search for objects having a similar pose to the object in the image, wherein the feature vector is generated based on the search parameter. In some examples, the feature vector further represents semantic information. In some examples, the feature vector further represents appearance information. In some examples, the comparing the feature vector to the plurality of additional feature vectors comprises calculating a Euclidean distance or a cosine distance between the feature vector and each of the plurality of additional feature vectors. In some cases, the rotation information includes 3D orientation information.

A system for performing image search based on 3D properties is described. Embodiments of the system may include an encoder configured to generate a feature vector based on an image of an object, wherein the feature vector represents object synthesis information and rotation information, and wherein the encoder is trained using a multi-task loss function comprising an object synthesis loss term and a rotation loss term and a comparison component configured to determine the similarity between two feature vectors.

Some examples of the system described above may further include a query component configured receive a search query comprising the image of the object. Some examples of the system described above may further include a results component configured to select one or more additional images based on the similarity, and to provide the one or more additional images in response to the search query.

In some examples, the encoder comprises a convolutional neural network (CNN) layer and a multilayer perceptron (MLP) layer. In some examples, the synthesis loss term is based on whether the object can be synthesized based on the feature vector. In some examples, the rotation loss term is based on a measure of a difference in a pose of the object compared to a pose of at least one additional object. In some examples, the multi-task loss function further comprises a ranking loss term or a classification loss term. In some examples, the ranking loss is based on selecting two images from a set of three images based on relevance. In some examples, the classification loss is based on object classification accuracy.

A method for training and ANN for performing image search based on 3D properties is described. Embodiments of the method may include identifying a training set, wherein each element in the training set includes an image of an object, and rotation information, generating a feature vector for each element in the training set, calculating a loss value using a multi-task loss function comprising an object synthesis loss term and a rotation loss term, and updating the ANN based at least in part on the loss value.

In some examples, the loss value is calculated, and the ANN is updated during each of a plurality of training iterations. Some examples of the method described above may further include generating a synthesized version of the object based on the feature vector, wherein the object synthesis loss term is calculated based on a comparison between the object and the synthesized version of the object.

In some examples, the multi-task loss function further comprises a ranking loss term or a classification loss term. Some examples of the method described above may further include identifying two additional images. Some examples may further include selecting a most relevant image from the two additional images, wherein the ranking loss term is based on the selection. In some examples, the ranking loss is based on one or more parameters from a set consisting of comparing pose similarity, object similarity, and category similarity.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for image searching, comprising:
generating a feature vector for each of a plurality of stored images using a machine learning model trained to generate representations of a three-dimensional (3D) object orientations;
receiving a search query comprising a search image with an object having a 3D orientation;
generating a query feature vector for the search image using the machine learning model, wherein the query feature vector is based at least in part on the 3D orientation;
comparing the query feature vector to the feature vector for each of the plurality of stored images; and
selecting at least one stored image of the plurality of stored images based on the comparison, wherein the at least one stored image comprises a similar orientation to the 3D orientation of the object in the search image.

2. The method of claim 1, wherein:
the machine learning model is trained using a rotation loss term.

3. The method of claim 2, wherein:
the machine learning model trained using an object synthesis loss term or an image ranking loss term.

4. The method of claim 1, further comprising:
providing the at least one stored image in response to the search query.

5. The method of claim 1, further comprising:
determining that a search parameter of the search query indicates a search for objects based on the 3D orientation, wherein the query feature vector is generated based on the search parameter.

6. The method of claim 1, wherein:
the query feature vector further represents semantic information corresponding to the object.

7. The method of claim 1, wherein:
comparing the query feature vector comprises calculating a Euclidean distance or a cosine distance between the feature vector and the feature vector for each of the plurality of stored images.

8. A system for image processing, comprising:
an encoder configured to generate a feature vector based on an image of an object, wherein the feature vector represents object synthesis information and rotation information, and wherein the encoder is trained using a loss function comprising a rotation loss term that measures whether an output of the encoder represents the rotation information;
a comparison component configured to determine a similarity between two feature vectors;
a query component configured to receive a search query comprising the image of the object; and
a results component configured to select one or more additional images based on the similarity, and to provide the one or more additional images in response to the search query.

9. The system of claim 8, wherein:
the encoder comprises a convolutional neural network (CNN) layer and a multilayer perceptron (MLP) layer.

10. The system of claim 8, wherein:
the loss function comprises a synthesis loss term that measures whether the object can be synthesized based on the feature vector.

11. The system of claim 8, wherein:
the rotation loss term is based on a measure of a difference in a pose of the object compared to a pose of at least one additional object.

12. The system of claim 8, wherein:
the loss function further comprises a ranking loss term or a classification loss term.

13. The system of claim 12, wherein:
the ranking loss term is based on selecting two images from a set of three images based on relevance.

14. The system of claim 12, wherein:
the classification loss term is based on object classification accuracy.

15. A method of training an artificial neural network (ANN) for image processing, comprising:
identifying a training set, wherein each element in the training set includes an image of an object and 3D orientation information for the object;
generating a feature vector for each element in the training set;

calculating a loss value using a loss function comprising a rotation loss term that measures whether an output of the ANN represents rotation information; and updating the ANN based at least in part on the loss value.

16. The method of claim 15, wherein:

the loss value is calculated, and the ANN is updated, during each of a plurality of training iterations.

17. The method of claim 15, further comprising:

generating a synthesized version of the object based on the feature vector; and calculating an object synthesis loss term based on a comparison between the object and the synthesized version of the object.

18. The method of claim 15, wherein:

the loss function further comprises a ranking loss term or a classification loss term.

19. The method of claim 18, further comprising:

identifying two additional images; and selecting a most relevant image from the two additional images, wherein the ranking loss term is based on the selection.

20. The method of claim 19, wherein:

the ranking loss is based on one or more parameters from a set consisting of comparing pose similarity, object similarity, and category similarity.

* * * * *